Dec. 12, 1950     T. H. WINKELJOHN     2,533,653
METHOD OF FINISHING RUBBER ARTICLES
Filed July 9, 1947
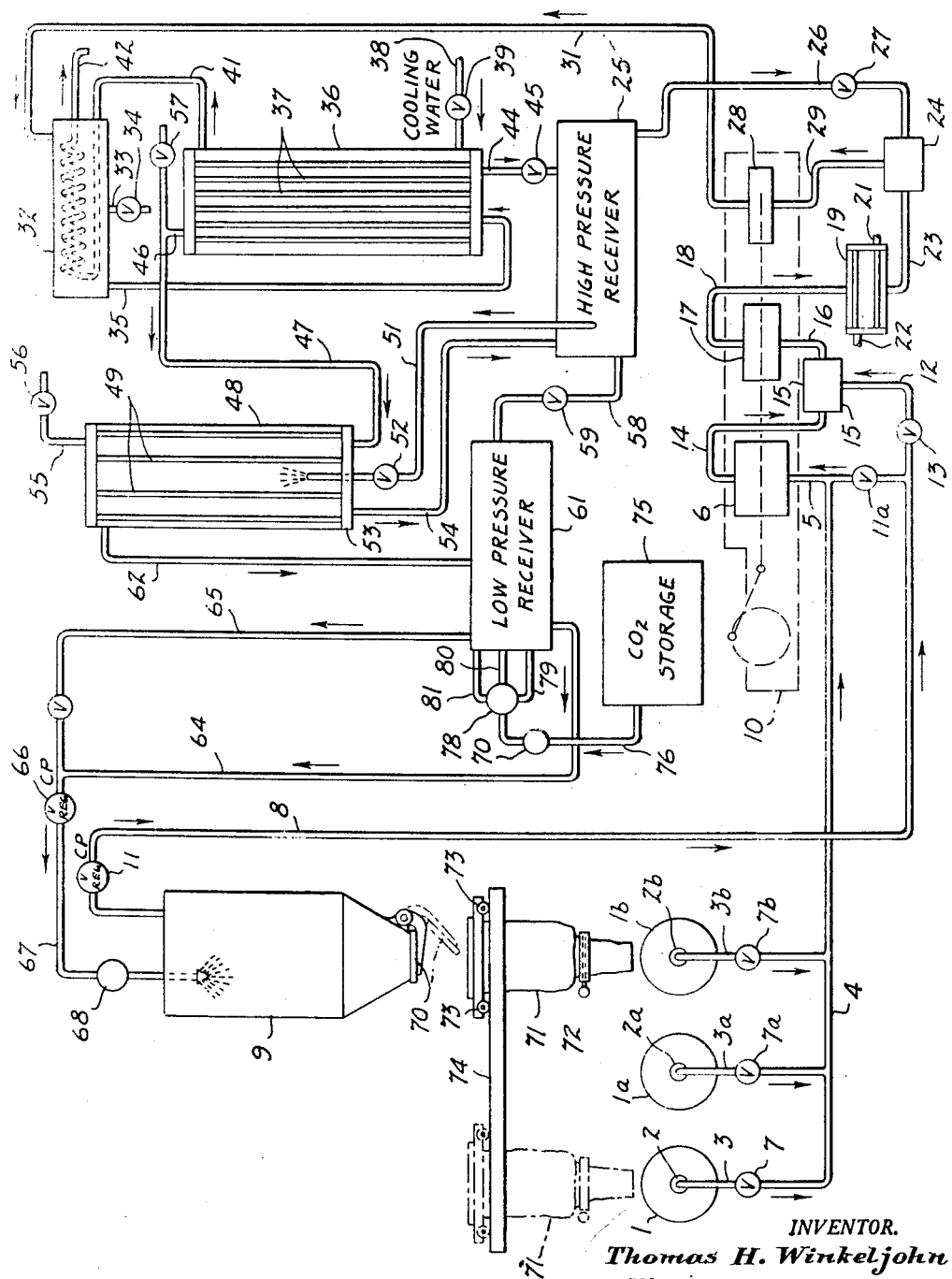
INVENTOR.
Thomas H. Winkeljohn
BY
Evans + McCoy
ATTORNEYS Patented Dec. 12, 1950

2,533,653

UNITED STATES PATENT OFFICE 2,533,653

METHOD OF FINISHING RUBBER ARTICLES

Thomas H. Winkeljohn, Wabash, Ind., assignor to The General Tire and Rubber Company, Akron, Ohio, a corporation of Ohio Application July 9, 1947, Serial No. 759,879

2 Claims. (Cl. 51—282)

This invention relates to the grinding of mold flash or fins on molded elastogenic materials, particularly molded rubbers and elastomers which are markedly stiffened or hardened at temperatures around −50° C. or −60° C.

It has long been known that rubber and elastomeric materials generally are hardened by sufficiently lowering the temperature thereof and it has been known that such materials are much more readily ground or broken into pieces when they are retained at relatively low temperatures, such as obtained by solid carbon dioxide and the like. The Cuno Patent 2,347,464, for example, discloses that vulcanized or unvulcanized rubber may be ground much more readily in the presence of solid carbon dioxide.

It has similarly been proposed, as shown by the Kopplin Patent 2,380,653, to grind only the fins from molded rubber articles by tumbling these articles in a rotating container or tumbling drum, such as illustrated in Fig. 10 of the Cramm Patent 1,516,913, in the presence of solid carbon dioxide under such conditions that the fins only are hardened so that they are readily removed from the body of the molded article. The grinding of the entire rubber or only the fin portions of rubber in the presence of sufficient carbon dioxide to harden the portion ground as previously practiced requires large amounts of the solid carbon dioxide. In fact the amounts of solid carbon dioxide used have been so great that until the rise of labor costs during and following World War II the process was not generally considered economical.

It is an object of the present invention to provide a method of grinding the fins from molded rubber articles wherein the amount of the carbon dioxide refrigerant required is considerably reduced below the amount required in processes heretofore proposed.

It is another object of the present invention to provide a low temperature definning process having all the advantages of processes heretofore developed but at much lower cost.

It is another object of the present invention to provide a method of grinding the flash or fins from molded rubber and other elastomers wherein the temperature of the fins or even the entire rubber article is reduced to the point of frangibility by carbon dioxide, but which utilizes the carbon dioxide more efficiently than processes heretofore proposed.

It is still another object of the present invention to provide a method and apparatus for definning molded articles whereby most of the carbon dioxide may be recovered and reused.

Other objects will be apparent from the following description of the invention, illustrated by the accompanying drawing which is a diagrammatic view of apparatus suitable for carrying out the present invention.

The present invention is based fundamentally on my discovery that the form of the carbon dioxide incorporated into the tumbling drum is exceptionally important and largely determines the quantity necessary to lower the temperature of the rubber articles to the point where the fins may be readily ground therefrom.

Carbon dioxide is supplied by the manufacturers in the form of lumps, and while these lumps have usually been cracked or broken to some extent, care has been used to prevent waste by the preparation of small pieces which have large surface areas and evaporate rapidly. I have found that even though one does lose 8% or 10% of the solid carbon dioxide in producing a carbon dioxide snow or fluff by a chopping process, the snow or fluff thus produced is so much more effective that substantial efficiency is gained. The snow or fluff may be prepared as indicated above by chopping solid carbon dioxide and fluffing the mass as by the use of high speed apparatus. It is preferably prepared by expanding the cooled liquid carbon dioxide under temperature conditions such that a large volume of gas is evolved with the liquid during the expansion and only a fluff is produced instead of a hard product.

In accordance with the preferred aspects of the present invention, the carbon dioxide fluff or snow is produced directly by expansion of the liquid carbon dioxide and is utilized without prior compression to a solid rigid state. The carbon dioxide evolved by vaporization in the tumbling drum is also reused and recondensed in a particular manner to form a fluffy or snowlike mass.

Referring more particularly to the drawing, the molded articles to be definned by grinding the fins therefrom are incorporated into one or more of a plurality of tumbling drums such as tumbling drum 1, 1a and 1b, which rotate about the respective axles 2, 2a and 2b. Each of these drums is suitably provided with a closable charging opening (not shown) in accordance with conventional practice and their entire surface is preferably insulated with a layer of suitable heat insulation (not shown). One of the axes or shafts about which the tumbling drums turn is hollow, as illustrated in Fig. 10 of the Cramm Patent 1,516,913 which designates the tumbling drum as a grinder. The outer end of the hollow shaft 2 is connected through a suitable rotary seal (not shown) with the respective conduits 3, 3a and 3b, all of which are connected to the suction tube 4, which is connected to the intake 5 of the first stage 6 of the compressor 10.

Valves 7, 7a and 7b, etc. are provided in the conduits 3, 3a and 3b so that withdrawal of gas from the drums 1, 1a and 1b may be discontinued when these drums are open for charging of finned material or withdrawal of definned material. The conduits 3a and 3b together with the suction tube 4, the intake 5 and the first stage 6 of the compressor 10 serve as means for withdrawing carbon dioxide vapor from the interior of the drums without permitting appreciable leakage of air. The valves 7, 7a and 7b are preferably adjusted in operation so that a pressure but slightly above atmospheric (say one or two ounces or so) is always maintained within the drums 1, 1a and 1b.

Conduit means such as a pipe 8 is also provided between a snow chamber 9 (more fully described hereinafter) and the intake 5 for connecting the interior of the snow chamber 9 to the intake of the first stage 6 of the compressor 10, so that the gas withdrawn from the snow chamber may if desired be mixed with the gas withdrawn from the tumbling drums prior to the first stage 6 of the compressor. Valve means 11 and 11a are preferably provided respectively in the conduit means 8 and in the intake 5 to regulate the flow of gas through the conduit means 8. The gas from the first stage 6 of the compressor 10 passes through the conduit 14 into the mixing chamber 15 where it is preferably mixed with at least a portion of the blow-back gas withdrawn from the snow chamber 9 through the conduit 8 and the auxiliary conduit 12, which makes connection between the conduit 8 and the mixing chamber 15. The gas from the mixing chamber passes through a conduit 16 into a second stage 17 of the compressor 10. A valve 13 is provided in the conduit 12 so that by relative adjustment of the valves 11a and 13 any desired proportion of blow-back gas from the snow chamber 9 may be distributed between the first and second stages of the compressor.

The gas from the second stage 17 of the compressor passes through the conduit 18 into the intercooler 19 where it is cooled by water entering through the pipe 21 and discharged through the pipe 22. The gas from the intercooler 19 passes through the conduit 23 into the mixing chamber 24 where it may be further cooled by expansion of liquid withdrawn from the high pressure receiver 25 through the conduit 26, which contains a valve 27 and which makes connection between the high pressure receiver 25 and the mixing chamber 24.

The gas from the mixing chamber 24 passes into the third stage 28 of the compressor 10 through the conduit 29. The gas is compressed in the third stage 28 of the compressor to condensing pressure of approximately 1029 lbs./sq. in. (absolute). This high pressure gas is transmitted through the conduit 31 into the oil separating means, such as the water-cooled oil separator 32, where it is reduced in temperature to about 110° F., and the oil entrained in the vapor is removed. The oil recovered from the gases is removed through the conduit 33 containing a valve 34, and the gas freed from oil is passed from the oil separator 32 through the conduit 35 into the lower portion of the precooler 36. In the precooler the gas is cooled by contact with surfaces such as the interior of tubes 37, the exterior of which is cooled by cooling water entering through the pipe 38 and the valve 39 and leaving the precooler through the pipe 41. The cooling water from the precooler is passed through the pipe 41 into the oil separator 32 from which it is discharged through the pipe 42.

Any liquid carbon dioxide formed from the precooler 36 may pass through the pipe 44 and the valve 45 into the high pressure receiver 25. Uncondensed gas from the precooler is passed successively through the conduits 46 and 47 into the secondary condenser 48. The condenser 48 is preferably also a vertical shell and a tube condenser containing tubes 49 and the gas from the primary condenser 36 is preferably incorporated within the tubes. The outer surfaces of the tubes 49 are cooled by expanding liquid transmitted from the high pressure receiver 25 through the conduit 51 and the expansion valve 52. The condensed high pressure liquid in the interior of the tubes 49 is cooled in the header 53 and is passed therefrom through the conduit 54 into the high pressure receiver 25. The air and a small quantity of carbon dioxide is periodically purged from the secondary condenser through the pipe 55 and the valve 56. A valve 57 is also preferably provided to close or open a portion of the pipe 47 so that air may also be purged therefrom.

The main portion of the liquid from the high pressure receiver 25 is passed through the conduit 58 and the expansion valve 59 into the low pressure receiver 61. The receiver 61 also receives the low pressure gas evolved from the liquid used in cooling the external surface of the tubes 49 in the secondary condenser 48. This gas is transported through the conduit 62 connecting the low pressure receiver to the cooling chamber of the secondary condenser 48.

The pressure within the low pressure receiver is preferably about 140 to 150 lbs./sq. in., absolute. Both liquid and gas accumulate in this low pressure receiver and are taken by separate lines 64 and 65, respectively, to the back pressure valve 66 where the pressure is slightly reduced. The mixture of gas and liquid from the back pressure valve 66 is passed through the conduit 67 and the expansion valve 68 into the upper portion of the snow chamber 9 where because of the rapid expansion of the liquid-gas mixture a snow or fluff is produced. The gas evolved in the chamber 9 is withdrawn through the conduit 8 into the compressor, preferably the second stage thereof, as previously described.

The carbon dioxide snow or fluff falls into the lower portion of the snow chamber 9, the bottom of which is provided with a mechanically-actuated cover or closure 70. When the closure 70 is in the position shown by solid lines in the drawing, the chamber 9 is sealed except for the conduits 67 and 68. Periodically, a portion of the snow is withdrawn from the snow chamber 9 into suitable containers, such as the conveyor-actuated containers 71 which are open at their upper ends and have suitable side closures 72 at the lower end thereof. The containers 71 may be carried by rollers 73 which rest upon a track 74 that sufficiently overlies the drums 1a and 1b, so that the snow may be suitably incorporated into the opening thereof, as apparent from the drawing.

Carbon dioxide that is lost during the processing of the present invention is replaced from the carbon dioxide storage tank 75. The tank 75 is connected to the low pressure receiver through the conduit 76, valve 77 and the header 78, which latter is connected to the low pressure receiver through the lines 79, 80 and 81.

In the operation of the present invention, the articles of molded flexible material, such as rubber, synthetic rubber, resin or other cold-hardenable elastomer, is incorporated into one or more of the tumbling drums, 1, 1a, 1b, etc. The carbon dioxide snow or fluff from the chamber 9 is emptied into the transportable containers 11 and by opening the slide 12 allowed to fall into the interior of the tumbling drum in direct contact with the molded articles. The cover on the drum is then closed, the appropriate valve 7, 7a or 7b opened, and the tumbling drums rotated. In a relatively short time the snow is completely vaporized and the articles are cooled to such a state that the fins are readily ground therefrom. The carbon dioxide used in cooling the articles is drawn through one or more of the conduits 3, 3a or 3b to the compressor, where it is forced through the remainder of the apparatus, as previously described, and recondensed to snow or fluff.

The following examples illustrate the present invention:

Tubular rubber articles, each having dimensions of around 1" x 1½" and a wall thickness of about ⅜", are molded in a multicavity mold. The separate tubular articles when removed from the mold are held together by the mold flash in sheets about three feet square. About five hundred pounds of the sheets thus formed are incorporated into a tumbling drum together with about fifty pounds of carbon dioxide snow. The tumbling drum has a volume of about fifteen cubic feet and has a single hollow shaft on one side connected through a conventional bellows type seal to the pipe 3 shown in the drawing. The tumbling drum 1 is rotated for about twenty minutes, whereupon the valve 7 is closed and the contents of the drum are expelled. The fins are completely ground from the molded rubber articles.

When the fifty pounds of carbon dioxide snow are substituted by about 75 pounds of granulated solid carbon dioxide, other conditions being the same, only a portion of the fins were found to be removed after twenty minutes, even though the solid carbon dioxide had all evaporated.

When one hundred and fifty pounds of granulated solid carbon dioxide are incorporated in the drum in place of the snow or fluff, previously mentioned, other conditions being the same, substantially the same result was obtained as with the fifty pounds of snow.

It will be seen from the above examples that even though 25% or 30% of the weight of the carbon dioxide may be lost in preparing the snow, as in a chopping process, the efficiency of refrigeration with snow or fluff is so much greater than the efficiency of refrigeration with granulated solid carbon dioxide that less of the solid carbon dioxide is utilized. Furthermore, by withdrawing the carbon dioxide vapor and recondensing it as illustrated in the drawing, under conditions such that gas and liquid are simultaneously passed through the expansion valve and the snow or fluff formed initially, it is seen that great savings occur.

It is to be understood that variations and modifications of the invention herein shown and described may be made without departing from the spirit of the invention.

What I claim is:

1. In a method of grinding the fins from articles molded of a cold-hardenable elastomer, wherein the articles are cooled by vaporization of solid carbon dioxide and thereafter tumbled with other similar articles to grind the fins thereof, the steps which comprise incorporating the solid carbon dioxide in the form of snow into contact with said molded articles and tumbling said articles while maintaining said contact, whereby the amount of solid carbon dioxide is very materially reduced.

2. In a method of grinding the fins from molded rubber articles wherein the articles are cooled by vaporization of carbon dioxide from the solid state and tumbled in a rotatable container to grind at least the fin portions thereof, the steps which comprise incorporating the carbon dioxide in the form of a snow or fluff into contact with the molded rubber articles in the rotatable container and tumbling said articles in said rotatable container while maintaining said contact.

THOMAS H. WINKELJOHN.

REFERENCES CITED

The following references are of record in the file of this patent:

UNITED STATES PATENTS

| Number | Name | Date |
| --- | --- | --- |
| 1,795,772 | Goosmann | Mar. 10, 1931 |
| 1,864,396 | Zumbro | June 21, 1932 |
| 2,380,653 | Kopplin | July 31, 1945 |
| 2,402,967 | Lubenow | July 2, 1946 |